United States Patent
Niemi et al.

(10) Patent No.: US 6,470,388 B1
(45) Date of Patent: Oct. 22, 2002

(54) COORDINATED EXTENDABLE SYSTEM FOR LOGGING INFORMATION FROM DISTRIBUTED APPLICATIONS

(75) Inventors: Frederick E. Niemi, Cary; Kenneth W. Chambers, Raleigh, both of NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/329,560

(22) Filed: Jun. 10, 1999

(51) Int. Cl.$^7$ ............................................... G06F 15/173

(52) U.S. Cl. ........................ 709/224; 709/223; 709/315

(58) Field of Search ................................ 709/223, 224, 709/314–318, 108, 101, 203, 202; 370/245, 254; 714/45

(56) References Cited

U.S. PATENT DOCUMENTS

| | | | | |
|---|---|---|---|---|
| 4,462,077 A | | 7/1984 | York ............................ | 364/300 |
| 4,849,879 A | | 7/1989 | Chinnaswamy et al. ..... | 364/200 |
| 4,985,894 A | | 1/1991 | Suga .......................... | 371/16.5 |
| 5,251,152 A | * | 10/1993 | Notess ....................... | 709/224 |
| 5,379,406 A | | 1/1995 | Wade .......................... | 395/500 |
| 5,446,680 A | | 8/1995 | Sekiya et al. ............... | 364/550 |
| 5,504,863 A | | 4/1996 | Yoshida ................... | 395/184.01 |
| 5,553,235 A | | 9/1996 | Chen et al. ............. | 395/182.18 |
| 5,612,898 A | | 3/1997 | Huckins ................. | 364/514 R |
| 5,642,478 A | | 6/1997 | Chen et al. ............. | 395/183.21 |
| 5,664,093 A | | 9/1997 | Barnett et al. ......... | 395/183.07 |
| 5,715,432 A | | 2/1998 | Xu et al. ..................... | 395/500 |
| 5,748,881 A | * | 5/1998 | Lewis et al. ................... | 714/47 |
| 5,802,291 A | * | 9/1998 | Balick et al. ................ | 709/202 |
| 5,958,004 A | * | 9/1999 | Helland et al. .............. | 709/101 |
| 6,260,062 B1 | * | 7/2001 | Davis et al. ................ | 709/223 |
| 6,263,255 B1 | * | 7/2001 | Tan et al. .................... | 700/121 |

OTHER PUBLICATIONS

Tivoli TME 10 NetView for OS/390 User's Guide, *Chapter 12. Managing NetView Data*, Copyright © 1997, 1998 by Tivoli Systems Inc.

*NetView MultiSystem Manager MVS/ESA*, Copyright 201 1996,IBM Corp.

*Tivoli Distributed Monitoring Datasheet*, Copyright© 1999, Tivoli Systems Inc.

(List continued on next page.)

*Primary Examiner*—Meng-Al T. An
*Assistant Examiner*—Wen-Tai Lin
(74) *Attorney, Agent, or Firm*—Cesari and McKenna, LLP; Michael R. Reinemann

(57) ABSTRACT

The present invention is directed to a system and method for centrally coordinating, collecting and storing error, trace, audit and other information in a computer network. Selected applications or processes running at various entities or hosts within the network instantiate one or more "debug" objects that collect particularized information. Each entity also includes at least one logging service layer that communicates with the application or process, and includes a communications resource and one or more state machine engines. In response to collecting error, trace, audit or other information, each debug object passes it to the respective logging service layer, which decides whether or not to forward it to a centralized logging facility disposed within the network. The forwarding of collected information depends on the state of the debug object. If the state of the debug object is enabled, then the logging service layer forwards the collected information to the centralized logging facility. At the centralized logging facility, the information is time-stamped and appended to a log file along with the application's name and the name of the entity or host at which the application is running. If the state of the debug object is disabled, the collected information is not forwarded, and is instead simply discarded by the logging service layer.

14 Claims, 6 Drawing Sheets

OTHER PUBLICATIONS

*Tivoli Enterprise Overview*, Copyright© 1999, Tivoli Systems Inc.

J. Baher, *IBM's NetView/6000 challenges the best*, PC Magazine, vol. 12, No. 20 (Nov. 23, 1993).

E. Birkhead, *NetView/6000 slingshots ahead*, LAN Computing, vol. 4, No. 10 (Oct. 1993).

C. J. Smith, A. J. Kulakow and K. L. Gannon, *HP OpenView Windows: A User Interface for Network Management Solutions*, Hewlett Packard Journal (Apr. 1990).

J. Herman and T. Forbath, *HP NetMetrix empowers IT to measure and report in the networked environment for accountability to the business and end users* (May 1997).

R. L. Ptak and J. Noel, *Moving from Reactive to Guaranteed Network Services* (Jun. 1998).

S. Vinoski, *CORBA: Integrating Diverse Applications Within Distributed Heterogeneous Environments*, Copyright © 1996 IEEE.

*Logging Messages with the Syslog Service*, Cisco Systems, Inc., published Dec. 18, 1997.

*System Error Log and Event Log*, Cisco Systems, Inc., published Jul. 16, 1998.

*Performance Management*, Cisco Systems, Inc., published Dec. 18, 1997.

*Fault Management*, Cisco Systems, Inc., published Dec. 20, 1997.

*Logging and Tracing*, Cisco Systems, Inc., published Dec. 20, 1997.

*SV + Error Log Administration and Event Log*, Cisco Systems, Inc., published Dec. 19, 1997.

* cited by examiner

COORDINATED EXTENDABLE SYSTEM FOR LOGGING INFORMATION FROM DISTRIBUTED APPLICATIONS

FIELD OF THE INVENTION

This invention relates generally to computer networks and, more specifically, to a system for coordinating the collection and storing of information from multiple applications and processes.

BACKGROUND OF THE INVENTION

Organizations, including businesses, governments and educational institutions, increasingly rely on computer networks to share and exchange information. A computer network typically comprises a plurality of interconnected entities. An entity may consist of any device, such as a host or server, that sources (i.e., transmits) and/or receives messages. A common type of computer network is a local area network ("LAN") which typically refers to a privately owned network within a single building or campus. In many instances, several LANs may be interconnected by point-to-point links, microwave transceivers, satellite hook-ups, etc. to form a wide area network ("WAN") or intranet that may span an entire city, country or continent. An organization employing multiple intranets, moreover, may interconnect them through the Internet. Remote users may also utilize the Internet to contact and exchange information with the organization's intranet.

One or more intermediate network devices are often used to couple LANs together and allow the corresponding entities to exchange information. For example, a bridge may be used to provide a "bridging" function between two or more LANs or a switch may be utilized to provide a "switching" function for transferring information between a plurality of LANS. A router is often used to interconnect LANs executing different LAN standards, to interconnect two or more intranets and/or to provide connectivity to the Internet. Routers typically provide higher level functionality than bridges or switches.

In many computer networks, applications or processes are distributed across numerous workstations and servers. For example, due to the complexity of many computer networks, network management applications have been developed to assist administrators in the configuration of their networks. These network management applications also facilitate the identification and correction of faults, and assist administrators in maintaining a high level of network performance. Examples of network management applications include HP OpenView® from Hewlett-Packard Co. of Palo Alto, Calif. and NetView 6000 from International Business Machines Corp. of Armonk, N.Y., each of which provide a suite of applications and processes for collecting, storing and displaying network information. These network management applications are typically distributed across several workstations or servers within the network, in part, because their processor and memory requirements often exceed the capabilities of a single workstation or server. Each instance of these applications, moreover, may be responsible for a different area or region of the respective computer network.

FIG. 1 is a highly schematic block diagram of a conventional computer network 100 including three workstations 102, 104 and 106, each running an instance of a network management application 108a, 108b and 108c, respectively, such as HP OpenView or IBM's NetView. Each instance 108a–c of the network management application, moreover, has been configured to acquire information from and to manage various network devices disposed throughout the computer network 100. Application 108a, for example, communicates with and obtains information from network devices 110, 112, 114 and 116, as indicated by arrows 118a–d. Application 108a may utilize the well-known Simple Network Management Protocol (SNMP) for acquiring information. Application 108b at workstation 104 acquires information from network devices 116, 120 and 122, as indicated by arrows 124a–c, and application 108c at workstation 106 acquires information from network devices 126, 128, 130 and 132, as indicated by arrows 134a–d.

These instances 108a–c of the network management application may also implement various processes for collecting particularized information or data. Application 108a, for example, may implement a trap receiver process 142. Traps are basically messages that are created in response to exceptional occurrences of devices in the network, such as illegal access, network connections transitioning to an inoperable state, loss of connectivity with neighboring devices, etc. Application 108b may implement a polling process 146 that periodically polls network devices 116, 120 and 122, and obtains data therefrom. A network topology process 150 may be implemented by application 108c at workstation 106 for discovering the various hosts, devices and communications links creating network 100.

Most application programs, including applications 108a–108c and processes 142, 146 and 150, can be configured to generate and locally store error, tracking, tracing, and other information. This information relates to the running or operation of the respective application or process, and is used to debug the application or process and trace faults or errors. For example, applications 108a–108c may each create a local file 136, 138 and 140, respectively, for storing error, auditing, tracing or other such information generated by the corresponding application 108a–108c. Trap receiver process 142 may similarly create a local file 144 in which it stores auditing information. Polling process 146 may create a local trace file 148 in connection with its polling of devices 116, 120 and 122. Network topology process 150 may create a local error file 152 for storing its error information. In addition, conventional computer workstations and servers typically include basic facilities for monitoring errors and other events occurring in the distributed applications that they are running. For example, UNIX workstations typically include a system log (syslog) daemon, which runs continuously under the operating system. The syslog daemon logs messages regarding discontinuous events, such as errors, warnings and state transitions that occur at that workstation. The syslog daemon writes the messages to a log file located at the workstation. Workstations and servers also include their own trap or interrupt facilities that record exceptional events. Each of these facilities may also have their own directories and files at the workstation or server for recording information.

During normal operation, applications and processes are generally configured so as to not log error, tracking and trace information. Casual logging of such information can consume significant resources and thus severely impact the performance of the application or process. However, when error conditions manifest, the error, tracking and trace facilities are enabled so as to ascertain the problem. Typically, the activation of such facilities must be performed on a per application basis. That is, commands are entered at the particular machine or workstation at which the subject application or process is running. Alternatively, the application or process may be stopped and its start-up configuration parameters changed so as to enable the desired facilities. After these configuration changes are saved, the application is re-started.

Although the distribution of applications, such as application 108, and processes across many workstations or servers typically improves accessibility and efficiency, it complicates the task of troubleshooting faults and error conditions. That is, with application 108 distributed across numerous machines 102–106, an error manifesting at one location (e.g., workstation 102) may actually be the result of a problem at some other location (e.g., workstation 104). In order to track down such problems, administrators and is service personnel are forced to go to each machine included within the distributed system and configure each application or process to generate the appropriate log messages. The administrator or service personnel must then examine these files located at each machine. That is, to troubleshoot errors in distributed network management applications, administrators must typically activate and then examine the trap, log, poll, trace and other files at each workstation running an instance of the network management application. The administrator may, for example, need to examine files 136 and 144 at workstation 102, files 138 and 148 at workstation 104, and files 140 and 152 at workstation 106, among others.

Each workstation, moreover, may store the information for a given application or process in a different directory and/or with a different format. That is, file 136 at workstation 102 may be in a different directory and may contain different information or information in a different format from file 138 at workstation 104, depending on the particular software or version that is running at each machine. These varying storage and formatting conditions further complicate the task of troubleshooting problems. In addition, the closing and re-starting of the subject applications or processes, which is often required to enable the desired facilities, sometimes causes the system to change such that the problem no longer manifests itself. Indeed, as applications and processes are distributed across more and more heterogeneous machines, the ability to troubleshoot and correct problems can almost become unmanageable.

It is an object of the present invention to provide a system and method for organizing the collection of error, trace, audit and other information generated by distributed applications and processes.

It is a further object of the present invention to provide a system and method for centralizing the storage of error, trace, audit and other information generated by distributed applications.

It is a further object of the present invention to allow users to customize the error, trace, audit and other information centrally collected from distributed applications.

It is a further object of the present invention to allow users to selectively activate from a central point the collection and centralized storage of particular error, trace, audit and other information.

A still further object of the present invention is to allow users to enable the logging of error, trace, audit and other information without having to close and re-start the corresponding application process.

SUMMARY OF THE INVENTION

Briefly, the present invention is directed to a system and method for coordinating the organization, collection and storage of error, trace, audit and other such information in a computer network. According to the invention, a plurality of "debug" objects are established for collecting particularized information from heterogeneous applications or processes. Instantiations of one or more these debug objects preferably exist at selected applications or processes, which may be distributed across multiple network entities, such as servers or workstations. Each network entity also includes a novel, extendable logging service layer that is in communicating relationship with the application or process, and is configured to provide common formatting and information storage services. The logging service layer includes a communications resource, one or more state machine engines and a callback generator. Upon initialization, the selected applications or processes issue methods or calls to the respective logging service layer identifying their one or more debug objects. The callback generator establishes a callback that identifies the application or process. In response to receiving or obtaining error, trace, audit or other information, the application or process preferably issues a method or call to one or more of its debug objects. The debug object passes this information to the logging service layer, which, in turn, decides whether or not to forward it to a selected logging facility. In the illustrative embodiment, there is a single, centralized logging facility within the network. The forwarding of information depends on the state of the debug object. If the debug object is in an enabled state, as determined by the state machine engine, then the logging service layer directs the communications resource to forward the information to the centralized logging facility. If the debug object is disabled, the information is discarded by the logging service layer. At the centralized logging facility, received information is time-stamped and appended to a primary log file along with the application's name and the name of the network entity at which the application is running.

To retrieve the error, trace, audit and other such information generated by any application or process within the network, an administrator simply requests the desired information from the centralized logging facility. In response, the centralized logging facility retrieves the requested information and forwards it to the administrator. In a further aspect of the invention, the administrator may change the state associated with any debug object at a selected application or process. In particular, upon obtaining the respective callback for the selected application, the administrator communicates with the corresponding state machine engine via the communication resource and directs it to change state. For example, an administrator may be interested in obtaining trace messages from an instance of application program "abc" running at network entity "123". The administrator directs the corresponding trace message debug object for application program "abc" to transition to the enabled state, thereby causing trace message information to be forwarded to and stored by the centralized logging facility. The administrator may then retrieve this information at any time. After reviewing the information, the administrator may change the state of the trace message debug object to disable, stopping the flow of trace message information from this instance of application program "abc" to the centralized logging facility.

In a still further aspect of the invention, the administrator may also obtain information directly from the applications or processes. In particular, the administrator may issue a GetDebugObjects service request to a particular instance of a distributed application. The GetDebugObjects service request is captured by the communications resource, which, in turn, returns to the administrator the list of debug objects that have been instantiated at the selected application. The administrator may use this information to set the states of the various debug objects at the application.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
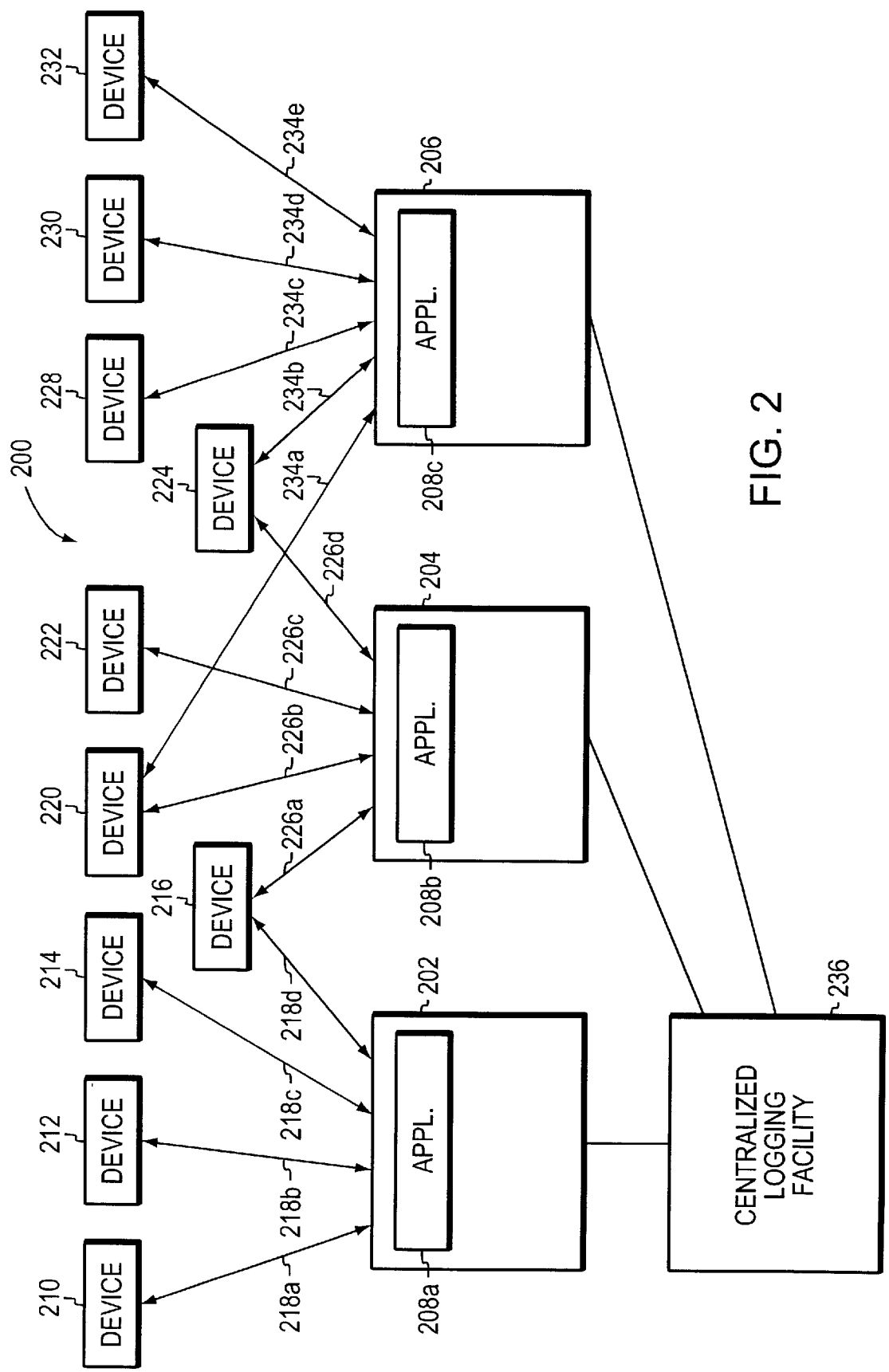
FIG. 2 is a highly schematic block diagram of a computer network in accordance with the present invention.

FIG. 2 is a highly schematic block diagram of a computer network 200 in accordance with the present invention. Network 200 includes three workstations 202, 204 and 206. Each workstation 202, 204 and 206, moreover, is running an instance of a distributed application 208a, 208b and 208c, respectively, such as a network management application. The instances of network management application 208a–c are configured to acquire information and data from various devices within network 200. In particular, instance 208a of the application acquires information from devices 210, 212, 214 and 216, as shown by arrows 218a–d. Instance 208b at workstation 204 acquires information from devices 216, 220, 222 and 224, as shown by arrows 226a–d. Instance 208c at workstation 206 acquires information from devices 220, 224, 228, 230 and 232, as shown by arrows 234a–e.

Figure 1:
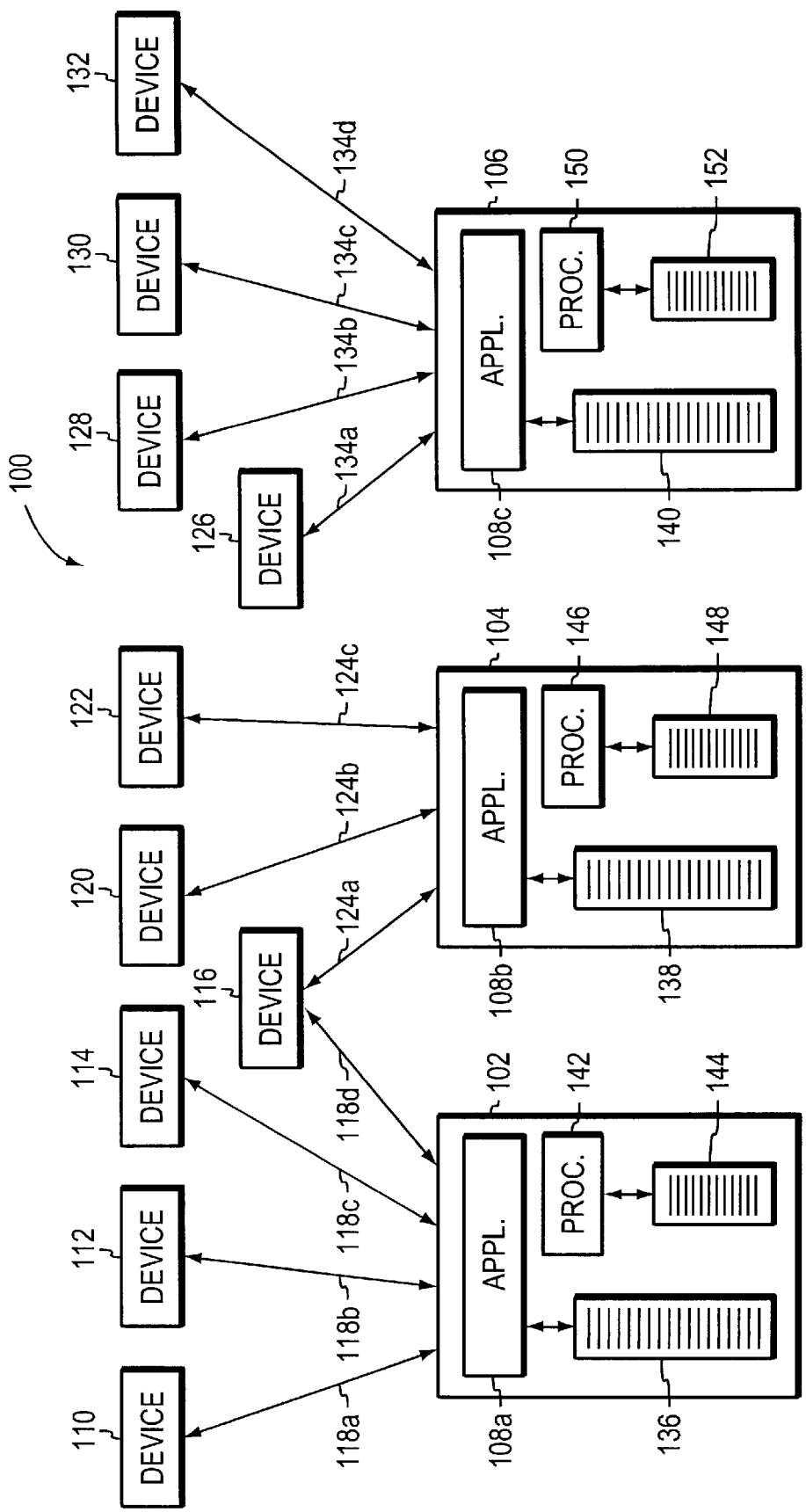
FIG. 1, previously discussed, is a highly schematic block diagram of a conventional computer network.

Application 208 may be a network management application, such as HP OpenView® from Hewlett-Packard Co. or NetView 6000 from International Business Machines Corp. Workstations 202, 204 and 206 may also be running instances of other distributed applications, such as an inventory or order control application from SAP AG of Walldorf, Germany or a customer service application from PeopleSoft, Inc. of Pleasanton, Calif. As described above, each network entity running an instance of a distributed application can be configured to create and store a plurality of error, trace, audit and other informational files associated with that instance of the application. In order to troubleshoot these applications, an administrator must often review the contents of each of these files which, as shown in FIG. 1, may be located at various machines that are dispersed throughout the network. In addition, the time at which any instance of the distributed application creates an entry to its error or informational files is unlikely to be related to the times at which other entities make corresponding entries, even though the corresponding event may nonetheless be related. Thus, it can be extremely difficult to piece together the operation of the distributed application from the contents of these disjoint files.

In the illustrated embodiment of the present invention, network 200 further includes at least one selected logging facility, such as centralized logging facility 236, that provides a central repository for error, trace, audit and other informational records and data generated by various instances of distributed applications and processes running at network entities dispersed throughout network 200.

It should be understood that network 200 is meant for illustrative purposes only and that the present invention will operate with other, often far more complex, network designs.

Figure 3:
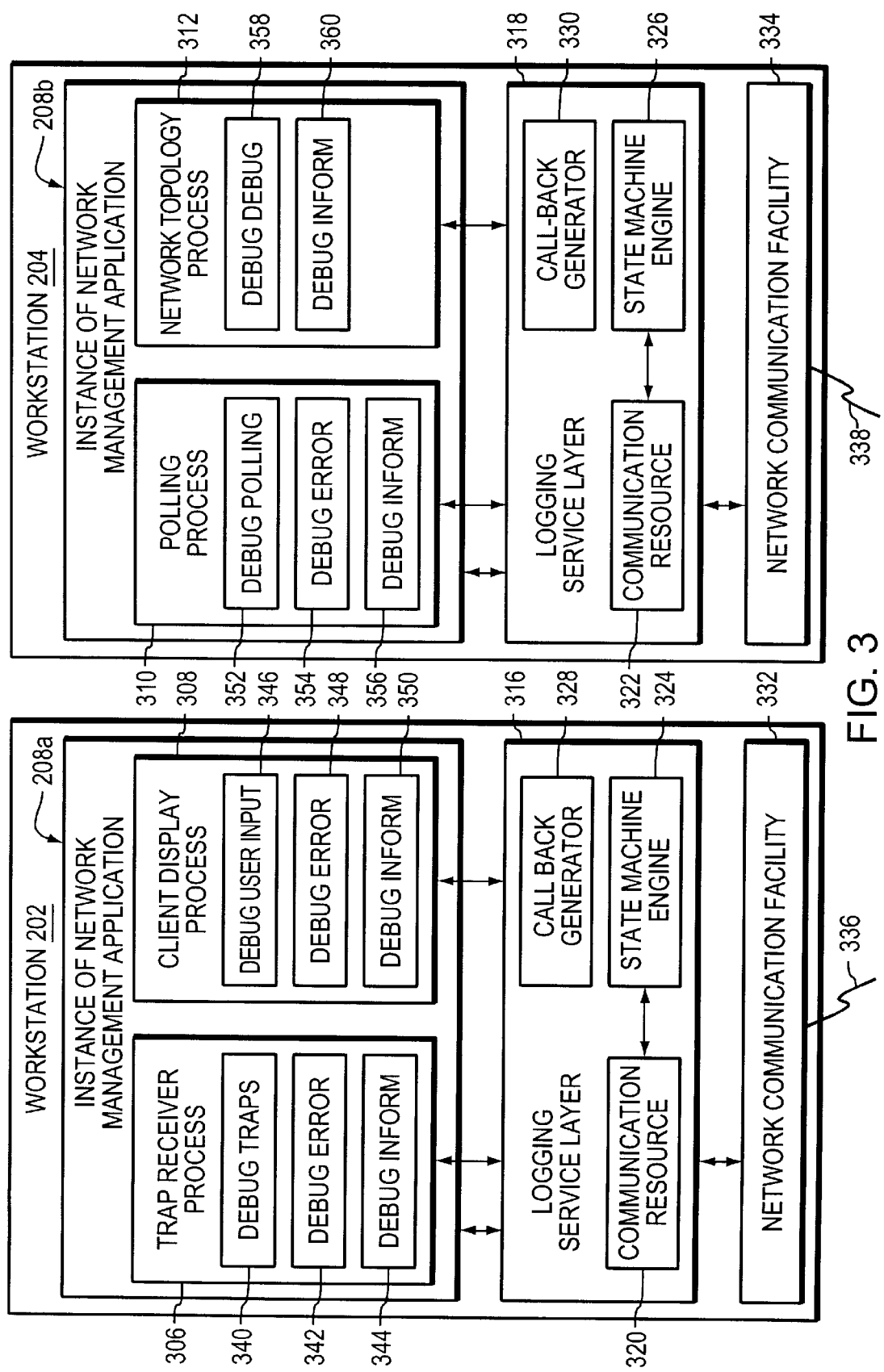
FIG. 3 is a highly schematic, functional diagram of two network entities in accordance with the present invention.

FIG. 3 is a highly schematic functional diagram of workstations 202 and 204, which are running instances 208a and 208b of the distributed application, respectively. In addition, the application 208a running at workstation 202 includes a trap receiver process 306 and a client display process 308, while the application 208b running at workstation 204 includes a polling process 310 and a network topology process 312. As described in more detail below, each application or process constructs one or more novel informational debug objects. Each workstation 202 and 204 also includes a novel logging service layer 316 and 318, respectively, that is in communicating relationship with the respective applications 208a, 208b, and processes 306–312. Each logging service layer 316, 318 includes a communication resource 320, 322, a call-back generator 328, 330, and at least one state machine engine 324, 326, respectively. The logging service layers 316, 318 are also in communicating relationship with a conventional network communication facility 332, 334, respectively, located at each workstation 202, 204. The network communication facilities 332, 334 provide connectivity to the computer network 200 (FIG. 2) as shown by arrows 336, 338. The network communication facilities 332, 334 may include conventional hardware and software components to support network communication in accordance with the Transmission Control Protocol/Internet Protocol (TCP/IP) Reference Model.

For purposes of explanation, a single logging service layer is illustrated at each workstation. However, in the preferred embodiment, each application or process, such as application 208a, trap receiver process 306 and client display process 308, is linked or otherwise includes its own logging service layer having a callback generator, communication resource and state machine engine.

Application programs 208a, 208b and processes 306–312 preferably communicate with and request services from their respective logging service layers 316, 318 through a plurality of application programming interface (API) system calls or service requests. These API calls or service requests, which are described in more detail below, are generally issued together with one or more arguments and may be returned by the logging service layers 316, 318 again with one or more arguments. The present invention includes the following API system calls or service requests (the arguments have been omitted for simplicity):

RegisterClient( )

Logo( )

GetDebugObjects( )

SetDebugObjects( )

Suitable workstations for use with the present invention include any Intel x86/Windows NT® or Unix-based platforms, such as the Ultra series of workstations from Sun Microsystems, Inc. of Mountain View, Calif. and/or the HP Visualize workstations from Hewlett-Packard Co.

Logging service layers 316, 318 preferably comprise programmed or programmable processing elements containing software programs, such as software modules or libraries, pertaining to the methods and functions described herein, and executable by the processing elements. Other computer readable media may also be used to store and is execute the program instructions. Logging service layers 316, 318 may also be implemented in hardware through a plurality of registers and combinational logic configured to produce sequential logic circuits and cooperating state machines. Those skilled in the art will recognize that various combinations of hardware and software components may also be utilized to implement the present invention.

In a preferred embodiment, the invention described herein, including the logging service layers 316, 318 and the debug objects, are implemented in an object-oriented programming (OOP) language, such as Java or C++. The Java and C++ languages are wellknown and many articles and texts are available which describe the languages in detail. In addition, Java and C++ interpreters and compilers are commercially available from several vendors. Accordingly, for reasons of clarity, the details of the Java and C++ languages and the operations of their interpreters and compilers will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like computers, while also modeling abstract concepts like numbers or geometrical designs.

Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. More specifically, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions that have the same overall format but that work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 4:
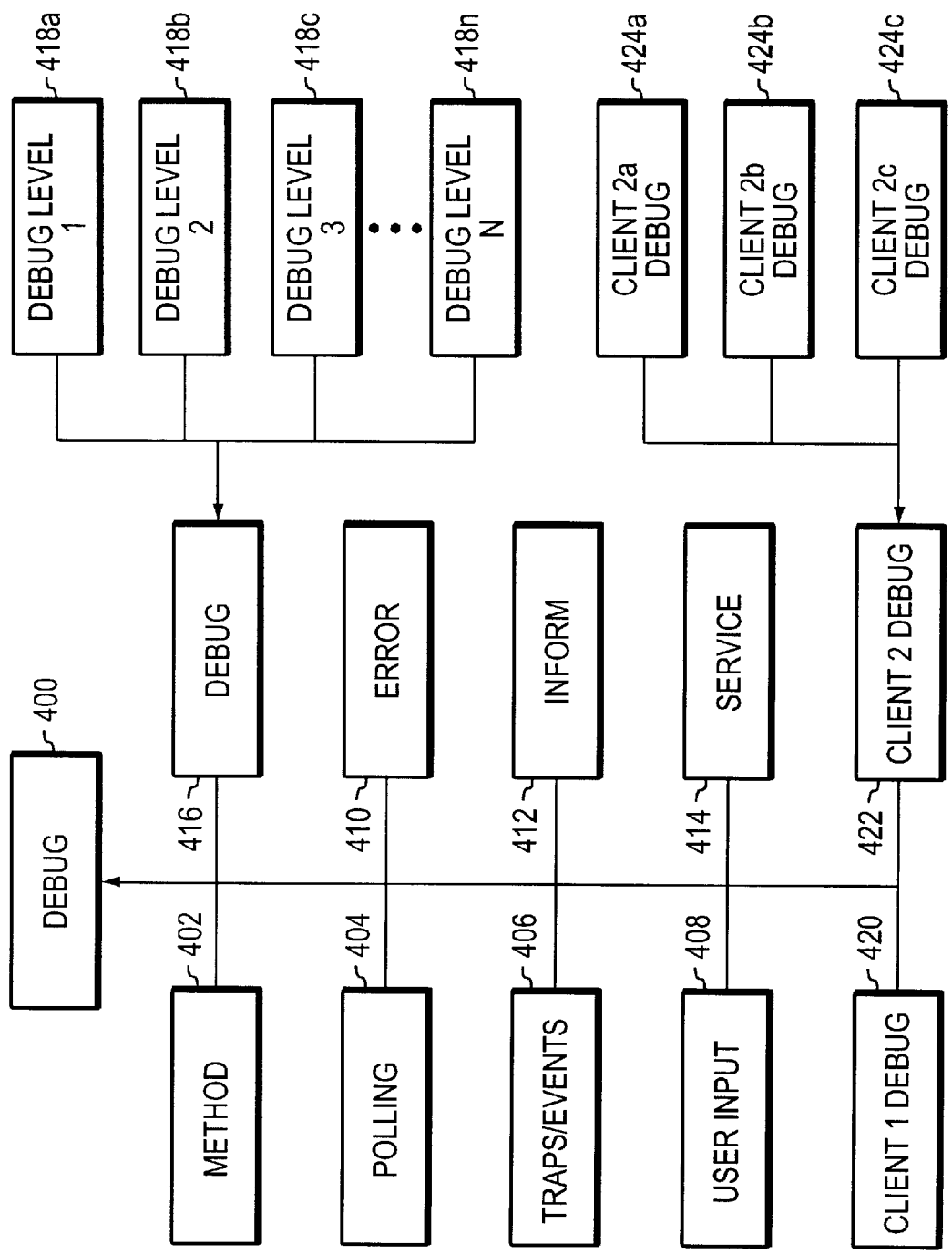
FIG. 4 is a simplified class hierarchy diagram illustrating a base Debug object class, and its associated subclasses and objects in accordance with the invention.

In accordance with the present invention, the applications 208*a*, 208*b* and/or processes 306–312 are configured to construct and manipulate novel "debug" objects. FIG. 4 illustrates a simplified hierarchy of a base Debug class 400, which defines the generic behaviors of that class. The base Debug class 400 is preferably utilized to build a plurality of debug objects, one or more of which may be instantiated by applications 208*a*, 208*b* (FIG. 3) and/or processes 306–312. More specifically, according to the invention, there are a plurality of preconfigured objects defined from the base Debug class 400. These preconfigured debug objects include a Method debug object 402 for use in tracing the execution of programming code through a selected application or process, a Polling debug object 404 for use in providing information about the polling of devices, a Traps/Event debug object 406 for use in logging the receipt of traps or events, a User Input debug object 408 for use in tracing inputs from a user through a user interface, such as a Graphical User Interface (GUI), an Error debug object 410 for use in providing information about the occurrence of errors in an application or process, an Informational (Inform) debug object 412 for use in recording informational messages regarding the progress or status of an application or process, and a Service debug object for use in tracing calls from a client application to a network service or server. In addition to these preconfigured debug objects, a debug sub-class 416 is also defined. The debug sub-class 416 is used to define one or more Debug debug objects 418*a*–418*n* for use in debugging an application or process. Each Debug debug object 418*a*–418*n* has a corresponding level, such as levels 1, 2, 3 . . . N, such that each level provides a different granularity of debugging information or control.

Application programmers, using the base Debug class 400, may also construct their own, customized debug objects or sub-classes. For example, a first application programmer may create a Client 1 debug object 420 for use in collecting a specialized type of error, trace, audit or other information. A second application programmer may create a Client 2 debug sub-class 422, which, in turn, may be used to define a plurality of Client 2 debug objects 424*a*–424*c*. Thus, the present invention is extendable in that application programs, using the base Debug class 400, may construct an infinite number of customized debug objects for use with their particular distributed applications.

Figure 5:
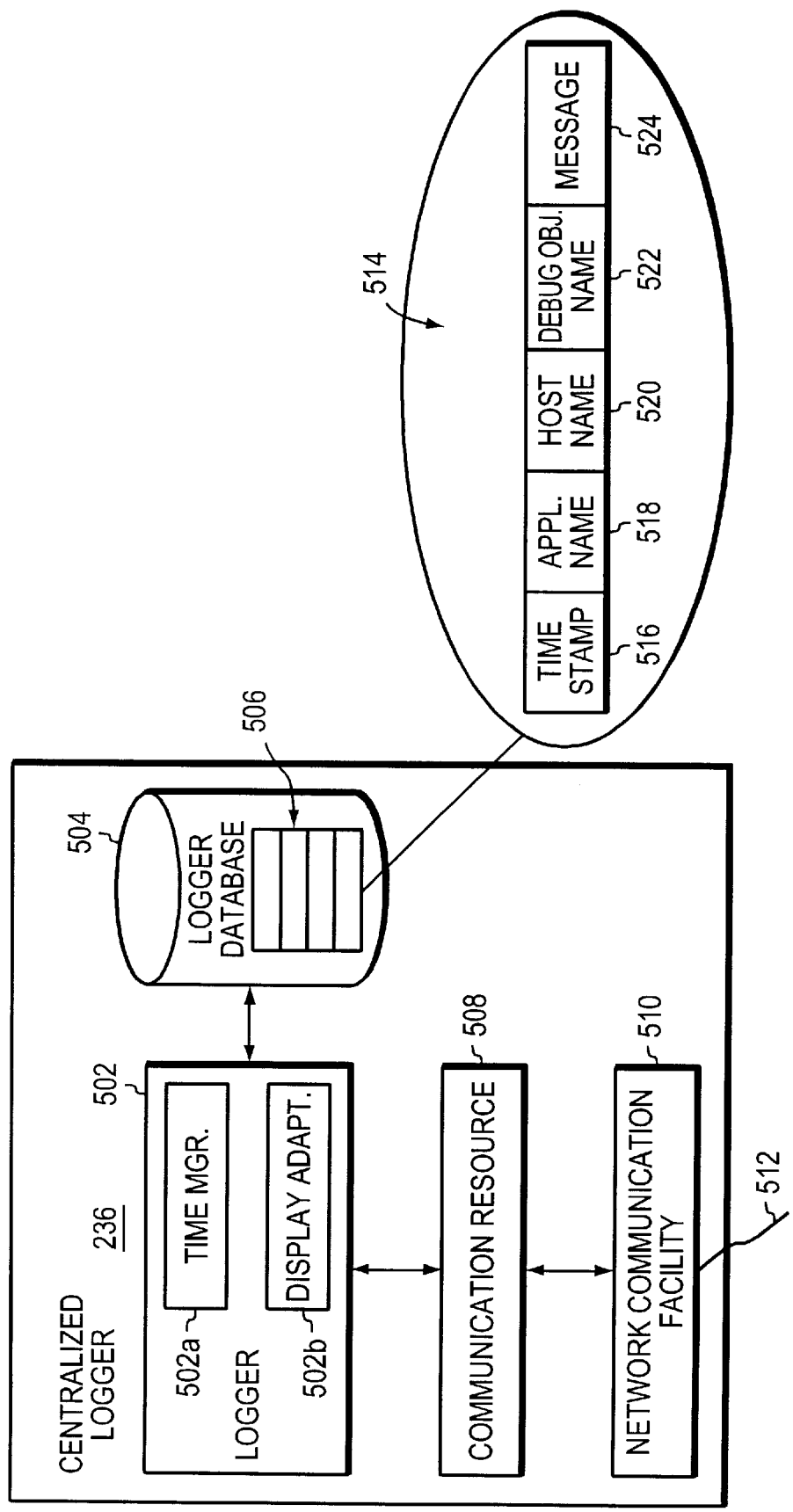
FIG. 5 is a highly schematic, functional diagram of a selected logging facility.

FIG. 5 is a highly schematic functional diagram of the centralized logging facility 236 of FIG. 2. The centralized logging facility 236 includes a logger process 502 that is in communicating relationship with a logger database 504, which, in turn, contains one or more log files 506. The logger 502 further includes one or more sub-processes, such as a time manager 502*a* and a display adapter 502*b*. It is also in communicating relationship with a corresponding communication resource 508, that is itself coupled to a conventional network communication facility 510. In a similar manner as described above, the network communication facility 510 provides connectivity to the network 200 (FIG. 2), as shown by arrow 512.

A suitable platform for the centralized logging facility 236 is any conventional server, such as the PowerEdge series of servers from Dell Computer Corp. of Round Rock, Tex., the Digital NT series of servers from Compaq Computer Corp. of Houston, Tex., or the HP 9000 series of Unix servers from Hewlett-Packard Co.

In the preferred embodiment, the logging service layers 316, 318 (FIG. 3) are implemented in accordance with the Common Object Request Broker Architecture (CORBA) from the Object Management Group (OMG), preferably as provided in Revision 2.2 of the CORBA Architecture and Specification from OMG, which is hereby incorporated by reference in its entirety. CORBA is basically a communications facility or architecture that allows applications or processes (i.e., clients) to request services of distributed objects (i.e., servers). With CORBA, clients need not know the network locations of the objects configured to execute their requests or the programming language in which those objects are written. These issues, among others, are resolved by CORBA, which is typically implemented at each client and server through an Object Request Broker (ORB). The ORB, moreover, provides one or more interfaces, defined in a language called Interface Definition Language (IDL), to its client or server applications and processes. That is, the client applications or processes communicate with the servers using the predefined IDL.

In order to communicate with ORBs located at other entities within a network, CORBA also implements the General Inter-ORB Protocol (GIOP). GIOP basically provides the ORB with a mapping to one or more transport layer protocols implemented within the network. One of the more established GIOP mappings is the Internet Inter-ORB Protocol (IIOP), which utilizes the Transmission Control Protocol (TCP) of the TCP/IP Reference Model for internetwork communication. Other GIOP mappings are available for IBM's Simple Network Architecture (SNA) and Novell's IPX protocol stacks. In a preferred embodiment, the communication resources 320, 322 of the logging service layers 316, 316 preferably implement IIOP.

It should be understood that, rather than utilizing the CORBA standards to perform distributed object manipulation, the logging service layers may utilize the Distributed Component Object Model (DCOM) from Microsoft Corp. of Redmond, Wash., or the Remote Method Invocation (RMI) developed by Sun Microsystems, Inc. for use with Java.

Each communication resource 320, 322 is preferably preconfigured with the name of the centralized logging facility 236 and the TCP/UDP port number of a conventional locator service of CORBA, which is used to "find" the centralized logging facility 236 in order to carry out requested logging services. Once the centralized logging facility 236 is found, the IIOP protocol is used to generate an Interoperable Object Reference, which the communication resources 320, 322 may use to reach the centralized logging facility 236. Communication resources 320, 322 may either be manually configured with this information, or they may retrieve it from one or more pre-identified servers.

Operation of the Centralized Logging Facility

Each instance of a distributed application or process first instantiates one or more debug objects defined from base Debug class 400. To instantiate a given debug object, the programming code for the application or process preferably includes a constructor that is configured to create objects from the base Debug class 400. For example, the application may use a constructor called "public Debug(string name)" where the name of the selected debug object (e.g., error) being created is inserted as an argument. Referring to FIG. 3, upon initialization of the trap receiver process 306 of application 208a, the process uses the public Debug( ) constructor to create or build instantiations of a Debug Traps/Events object 340, a Debug Error object 342 and a Debug Inform object 344. The client display process 308 similarly utilizes the public Debug( ) constructor to create instantiations of a Debug User Input object 346, a Debug Error object 348 and a Debug Inform object 350. At workstation 204, the polling process 310 uses the public Debug( ) constructor to create instantiations of a Debug Polling object 352, a Debug Error object 354 and a Debug Inform object 356. The network topology process 312 similarly creates a Debug Debug object 358 and a Debug Inform object 360. After instantiating the desired debug objects, each application or process preferably registers those objects with its respective logging service layer using one or more API system calls or service requests.

More specifically, in response to constructing the first debug object, the logging service layer (e.g., layer 316) for the respective application or process (e.g., trap receiver process 306) is initialized and accesses its call-back generator (e.g., generator 328) to create a unique call-back for use in identifying respective application or process. The logging service layer 316 also establishes communication with the centralized logging facility 236. In particular, the logging service layer 316 issues a RegisterClient( ) service request to the centralized logging facility 236. The logging service layer 316 preferably enters the name of the respective application or process, its callback and the name of the first instantiated debug object as arguments to the RegisterClient( ) service request. Communications resource 320 at workstation 202 marshals the RegisterClient( ) service request into a canonical format, and, using the IIOP protocol, passes it to the network communication facility 336. Communication facility 336, in turn, encapsulates the marshaled RegisterClient( ) service request into one. or more data packets and/or frames for transmission across the network 200. These data packets are routed to the centralized logging facility 236 in a conventional manner. At the centralized logging facility 236, the data packets are captured by the network communication facility 510, decapsulated and passed up to the communication resource 508, which, in turn, hands the service request up to the logger 502. The logger 502 preferably stores the name of the application or process associated with the received Register Cliento, its listed Debug object, and callback in transient or volatile memory (not shown).

In response to the creation of the second and subsequent debug objects at a given application or process, the respective logging service layer preferably issues a SetDebugobjects( ) service request to the centralized logging facility 236 in a similar manner. The logging service layer preferably enters the callback of the application or process and the name of the second or subsequent debug object being created as arguments to the SetDebugObjects( ) service request. At the centralized logging facility 236, the name of the second or subsequent debug object entered in the SetDebugObject( ) service request is added to the information stored for the respective callback (i.e., application or process) in transient memory. This procedure is followed for each application and process of network 200 that is operating in accordance with the present invention. Accordingly, the centralized logging facility 236 stores the callback and the name of the debug objects instantiated by each application or process in a portion of its transient memory.

With reference to FIG. 3, in the course of processing or running, each instance of a distributed application or process may call one of its debug objects in order to record error, trace, audit or other information that has been received or obtained by the application or process. More specifically, program developers preferably add specific code to their applications or programs calling a debug object in response to the occurrence of some event or condition that may be of interest during debugging or troubleshooting. For example, if the trap receiver process 306 receives a trap, it preferably calls its Debug Traps/Event object 340. If the polling process 310 issues a poll or receives data in response to its polls, it preferably calls its Debug Polling object 352. That is, in addition to issuing a conventional write command in response to receiving information, which causes the corresponding trap or poll to be written to a local file, the application or process, in accordance with the present invention, also invokes one or more debug objects. Preferably, the application or process issues a "Debug.<debug object name>.log" command that includes the name of the respective debug object (e.g., Traps/Events, Polling, Method, etc.) and the corresponding event (e.g., received trap, polled device, received poll, etc.).

Suppose, for example, that the trap receiver process 306 at workstation 202 receives a trap message. In response, it issues a Debug.traps/events.log(string) command noting that a trap was received. To conserve processor and memory resources, process 306 preferably does not include the contents of the trap itself in the Debug.traps/events.log command, just the fact that a trap occurred. The respective logging service layer 316, in response, determines whether this Debug.traps/events.log message should be forwarded to the centralized logging facility 236. In accordance with the present invention, the forwarding of error, trace, audit or other information received from a local Debug object to the centralized logging facility 236 preferably depends on the state of the Debug object instantiated by the application or process. Debug objects may be in one of two possible states: enabled or disabled. If the corresponding Debug object is in the enabled state, the logging service layer preferably forwards the respective error, trace, audit or other information to the centralized logging facility 236. If the corresponding Debug object is in the disabled state, the logging service layer simply discards the data.

To determine the state of a particular Debug object, the logging service layer queries its one or more state machine engines, which, in turn, issues a GetState( ) method to the respective debug object. The debug object, in response to the GetState( ) method, returns its state (i.e., enabled or disabled) to the state machine engine. Continuing with the above example, logging service layer 316 accesses state machine engine 324 to determine the state of the Debug Traps/Event object 340 at process 306. If object 340 is in the enabled state, the logging service layer 316 issues a Log( ) service request to the centralized logging facility 236 entering the name of the application or process, the name of the host or workstation at which the application or process is running, the name of the corresponding debug object, and the message as arguments. In particular, the communication resource 320 of logging service layer 316 converts (e.g., marshals) the Log( ) service request into a standard canonical format and passes it to the network communication facility 332. From here, the Log( ) service request may be encapsulated in one or more data packets and transmitted to the centralized logging facility 236.

At the centralized logging facility 236 (FIG. 5), the data packets are captured by the network communication facility 510 and decapsulated so as to recover the Log( ) service request, which is then passed up to the communication resource 508. The communication resource 508 of the centralized logging facility 236, which is also implemented in accordance with CORBA, converts the Logo service request as necessary so as to render it compatible with logger 502, and hands the message up. The logger 502 extracts the information from the Log( ) service request and appends it to the end of the log file 506 at database 504. That is, logger 502 creates a new record or data entry 514 corresponding to the received Log( )service request of process 306. This new record 514 includes a plurality of fields, such as a time stamp field 516, an application name field 518, a host name field 520, a debug object name field 522 and a message or data field 524.

In the time stamp field 516, the logger 502 enters the date and time that the particular Log( ) service request was received at the centralized logging facility 236 as determined by the time manager sub-process 502a. In the application name field 518, the logger 502 enters the name of the application or process that sourced the Log( ) service request. In this case, the logger 502 enters the name of trap receiver process 306. In the host name field 520, logger 502 enters the name of the network entity from which the Log( ) service request was sent (i.e., workstation 202). In the debug object name field 522, logger 502 enters the name of the debug object that generated the error, trace, audit or other information contained in the Log( ) service request (i.e., Debug Traps/Events).

In the message field 524, logger 502 enters the actual error, trace, audit or other information generated by the corresponding application or process and contained in the Log( ) service request. It should be understood that record 514 may contain additional fields and information corresponding to the Log( ) service request from trap receiver process 306 (FIG. 3).

The logging service layers 316, 318 and/or the centralized logging facility 236 handle the translation of the Log( ) service request as necessary. That is, to the extent the format of the Log( ) service request generated by a particular application or process differs from the format as recognized by the centralized logging facility 236, the CORBA aspects of the logging service layer takes care of the required translation. Nonetheless, to ensure a consistent, base format for all messages stored at the centralized logging facility 236, the logging service layers may perform a translation on the contents of the Log( ) service requests. That is, with prior art systems, the information generated by various instances of a distributed applications or heterogeneous applications are often in different, typically incompatible formats. To overcome this difficulty, the present invention translates the format of the message into a common format. For example, the logging service layers 316, 318 may translate a message in Microsoft(& Word 6.0 format into an ASCII text format so that it may be viewed regardless of the word processing or viewing application being applied. The logging service layers 316, 318 is preferably preconfigured with the desired base or common format for the contents of Log( ) service requests. The communication resource 508 or logger 502 may also include and apply a conventional translation facility.

This process is repeated for each distributed application and process within network 200. That is, Log( ) service requests from the client display process 308 of workstation 202, as well as Log( ) service requests from the polling process 310 of workstation 204, are forwarded to the centralized logging facility 236 by the respective logging service layers 316, 318, provided that the corresponding debug objects are in the enabled state. At the centralized logging facility 236, the logger 502 creates a new record 514 for each received Logo service request, entering the respective information into fields 516–524, and appends the new record 514 to the end of the log file 506. The log file 506 thus represents a centralized repository for all error, trace, audit or other information generated by the instances of the applications and processes distributed throughout the computer network 200. To trace error conditions or perform other administrative tasks, a network administrator preferably accesses and reviews the contents of log file 506 from the centralized logging facility 236. In particular, an administrator, either locally at the centralized logging facility 236 itself or remotely, may access and display the contents of the log file 506 at any time.

Figure 6:
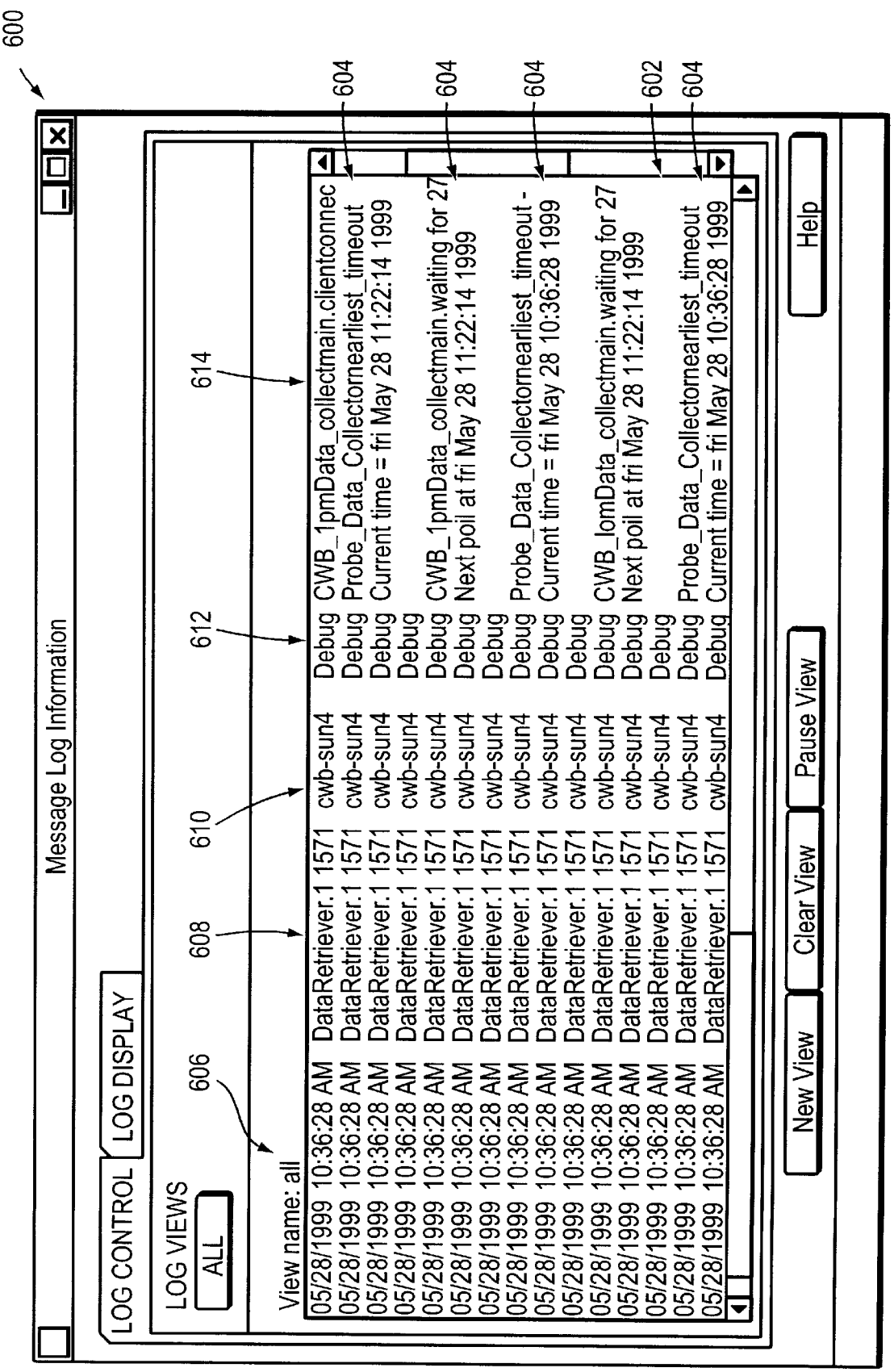
FIG. 6 is a representative display of error, trace, audit or other information collected by the centralized logging facility.

FIG. 6 is a highly schematic representation of a display 600 of the contents of the log file 506 (FIG. 5). The display 600 includes a main window 602 in which information from the individual records 514 of file 506 are shown. In particular, the main window 602 displays information in a plurality of rows 604, and each row 604 corresponds to a specific record 514 from the log file 506. In addition, the information presented in each row 604 is arranged into a plurality of columns. A first column 606, for example, presents the time at which the respective error, trace, audit or other information was received by the centralized logging facility 236 (FIG. 5), as obtained from the time stamp field 516 of the respective record 514. A second column 608 identifies the name of the application or process (e.g., trap receiver process, polling process, test event server, etc.), as obtained from field 518 (FIG. 5) of the respective record 514. A third column 610 identifies the network entity (e.g., workstation 202, workstation 204, etc.) that sourced the particular error, trace, audit or other information presented in the respective row 604, as obtained from field 520 (FIG. 5) of the respective record 514. A fourth column 612 identifies the name of the debug object as reflected by field 522 of the record 514. A fifth column 614 contains the particular error, trace, audit or other information contained in the message field 524 of the respective record 514.

It should be understood that each row 604 of main window 602 may include additional columns containing further information.

With display 600, the administrator has a single source from which to review error, trace, audit and other information generated throughout the network 200. Display 600 also provides a common time reference against which error, trace, audit and other information, as generated by different applications and processes executing at different machines throughout the network, may be compared. With the prior art systems, this information would be stored at multiple file locations at different machines throughout the network. In addition, it would be extremely difficult, if not impossible, to determine the temporal relationship of an error occurring in two applications or processes running at two different machines, since the time stamps (if any) entered by these machines are unlikely to be synchronized with each other.

The administrator may also perform searches on the contents of the log file 506. For example, the administrator may issue a SearchLog( ) service request to the centralized logging facility 236. The SearchLog( ) service request preferably contains a search string as one of its arguments. The search string may contain a date, application, host, debug object or other type of restriction. The logger 502 searches the log file 506 and returns those records 514 matching the search string specified by the SearchLog( ) service request.

Modifying Debug States

In a further aspect of the invention, an administrator may change the state of a debug object defined and instantiated at any application or process, effectively turning the respective debug object "on" or "off". In particular, an administrator, again either locally or remotely, obtains from the centralized logging facility 236 the name of a selected application or process and its respective callback. The administrator then formulates a GetObjects( ) service request entering the retrieved callback as an argument. The GetObjects( ) service request may then be marshaled and encapsulated into one or more data packets, and forwarded by the administrator to the particular network entity (i.e., workstation, server, host, device, etc.) at which the application or process of interest is running. The network communication facility of the corresponding entity captures the data packets and recovers the GetObjects( ) service request which it passes up to the respective logging service layer. The logging service layer retrieves the list of debug objects established by the application or process associated with the identified callback and their corresponding states, enters them as arguments in the GetObjects( ) service request, and returns the GetObjects( ) service request to the administrator. The administrator reviews this information and decides whether or not to modify the state of any of the debug objects.

It should be understood that the administrator may also obtain the name of the debug objects instantiated by a given application or process directly from the centralized logging facility 236.

To modify the state of a selected debug object, the administrator preferably issues a SetDebugState( ) service request, which is executed against the callback generator associated with the respective application or process. As arguments to the SetDebugState( ) service request, the administrator enters the name of the debug object and the new state (e.g., enabled or disabled). The SetDebugState( ) service request is then marshaled and encapsulated into one or more data packets for transmission across the network, where it is captured by the respective entity, recovered and passed up to the logging service layer. In response, the callback generator of the logging service layer issues a SetState( ) method on the identified debug object modifying its state as provided in the SetDebugState( ) service request received from the administrator.

Suppose, for example, that the administrator has identified a problem with the polling of network devices and also with the determination of the network topology. In response, the administrator may wish to activate various error, tracing, tracking, inform or other debugging-type debug objects in all instances of the polling process and the network topology process running in the network 200 (FIG. 2). From the centralized logging facility 236, the administrator learns that an instance of the polling process and an instance of the network topology process are both running at workstation 202 (FIG. 3). Accordingly, the administrator issues a GetDebugObjects( ) service request to logging service layer 318 in order to learn what debug objects are defined and instantiated at these processes. In response, the logging service layer 318 returns the GetDebugObjects( ) service request to the administrator with the names of the particular debug objects and their corresponding states as arguments. Accordingly, the administrator may learn that the debug polling object 352, the debug error object 354 and the debug inform object 356 are all instantiated at polling process 310, and that the debug debug object 358 and the debug inform object 360 are each instantiated at the network topology process 312. The GetDebugObjects( ) service request, as returned to the administrator, may also reflect that each of these Debug objects are disabled.

To assist in tracing the problem, the administrator may wish to activate these debug objects so that corresponding information will be recorded at the centralized logging facility 236. Accordingly, the administrator formulates one or more SetDebugObjectState( ) service requests directing logging service layer 318 to change the states for the Debug error object 354, the Debug inform object 356, the Debug debug object 358 and the Debug inform object 360 to enabled. The SetDebugObjectState( ) service request is then forwarded to logging service layer 318, which, in response, directs its state machine engine 326 to set the states for these debug objects accordingly. Thereafter, as the Debug error object 354, the Debug inform object 356, the Debug debug object 358 and the Debug inform object 360 issue a Debug.<debug object name>.log commands to logging service layer 318, corresponding Log( ) service requests are forwarded to the centralized logging facility 236 for recordation. That is, with the state of these objects now enabled, logging service layer 318 forwards Log( ) service requests to the centralized logging facility 236, which, in turn, appends the corresponding information to its log file 506, as described above.

The administrator may then examine the contents of the single log file 506 at the centralized logging facility 506 in an effort to trace the origin of the problem. Once the problem is resolved, the administrator preferably deactivates these debug objects in order to conserve communication bandwidth within the network 200. That is, the administrator sends another SetDebugObjectState( ) service request to logging service layer 318, although this time the SetDebugObjectState( ) service request sets the state of the respective Debug objects to the disabled state. Thereafter, when these Debug objects issue Debug.<debug object name>.log commands to logging service layer 318, the information is simply discarded and no Logo service requests are issued. The setting of debug objects states preferably occurs without notice to or awareness by the respective application or process. That is, the application or process continues to issue Debug.<debug object name>.log commands without knowing whether the corresponding debug object is enabled or disabled. Accordingly, a change in a state for a given debug object has no effect on the running or execution of the corresponding application or process, and the logging of error, trace, audit and other information can be enabled without having to close and restart the subject applications or processes.

Applications and processes may also be configured to issue a Terminate( ) service request that terminates any debug objects that they previously registered.

It should be understood that all or some subset of debug objects defined or created by any given application or process may commence in the disabled state. It should be further understood that an application or process may insert a desired state (e.g., enabled) as an argument to the RegisterClient( ) method so that the respective logging service layer directs its state machine engine to set the corresponding debug objects to the desired state.

It should be further understood that the selected logging facility may be disposed at one of the workstations 202–204 rather than in a separate entity as shown in the illustrated embodiment. It should be further understood that large, complex computer networks may include several selected logging facilities, each coordinating the collection and storage of information from specific, possibly overlapping, regions of the network.

The foregoing description has been directed to specific embodiments of the invention. It will be apparent, however, that other variations and modifications may be made to the described embodiments, with the attainment of some or all of their advantages. For example, rather than linking a logging service layer to each application or process at a given network entity, the applications or processes at several entities may utilize the logging service layer of a single neighboring entity. Therefore, it is the object of the appended claims to cover all such variations and modifications as come within the true spirit and scope of the invention.

What is claimed is:

1. A method for coordinating the collection of error, trace, audit or other such information generated within a computer network, the method comprising the steps of:

constructing one or more informational debug objects at a first application or process whereby each informational debug object corresponds to a particular type of error, trace, audit or other information generated by the first application or process;

providing a logging service layer in communicating relationship with the application or process;

associating each informational debug object constructed at the first application or process with either an enabled state or a disabled state;

in response to obtaining error, trace, audit or other information at the first application or process, issuing a log command to the logging service layer that identifies the respective informational debug object and contains the obtained error, trace, audit or other information; and forwarding a log service request containing the obtained error, trace, audit or other information from the logging service layer to a selected logging facility, where the respective informational debug object is associated with the enabled state.

2. The method of claim 1 further comprising the step of discarding the obtained error, trace, audit or other information, where the respective informational debug object is associated with the disabled state.

3. The method of claim 2 further comprising the steps of:

issuing one or more register service requests to the logging service layer, in response to constructing one or more informational debug objects at the application or process, that identify each of the informational debug objects that have been constructed; and forwarding the register service requests containing the informational debug objects constructed at the application or process to the selected logging facility.

4. The method of claim 3 further comprising the steps of:

generating a callback for identifying the application or process in response to receiving a register service request at the logging service layer; and forwarding the callback to the selected logging facility along with the register service request.

5. The method of claim 4 further comprising the step of modifying the state of a selected informational debug object in response to receiving a set service request at the logging service layer that identifies the selected informational debug object and the modified state.

6. The method of claim 5 further comprising the step of, in response to receiving a get service request at the logging service layer that specifies a given callback, returning the get service request with the informational debug objects constructed at the application or process identified by the given callback.

7. The method of claim 6 further comprising the step of defining a base informational debug class from which the informational debug objects may be constructed at the application or process.

8. The method of claim 7 wherein the informational debug objects constructed at the application or process may include one or more of a METHOD debug object, a POLLING debug object, a TRAPS/EVENTS debug object, a USER INPUT debug object, an ERROR debug object, an INFORMATION debug object, and a SERVICE debug object.

9. The method of claim 1 further comprising the steps of:

creating a log file at the selected logging facility; and in response to receiving the log service request at the selected logging facility, storing the error, trace, audit or other information contained in the received log service request in the log file.

10. The method of claim 9 wherein the step of storing comprises the steps of:

creating a data record corresponding to the error, trace, audit or other information contained in the received log service request; and appending the data record to an end of the log file.

11. The method of claim 10 wherein the data record created by the selected logging facility includes a time stamp field, an application or process name field, a host name field, an informational debug object name field and a message field.

12. The method of claim 11 wherein the selected logging facility is a centralized logging facility disposed within the computer network.

13. A computer workstation for use in a computer network having a centralized logging facility, the computer workstation including at least one application or process configured to construct one or more informational debug objects, and a network communications facility configured to provide inter-communication with the computer network, the workstation comprising:

a logging service layer in communicating relationship with the application or process, the logging service layer comprising:

a state machine engine associated with each of the one or more informational debug objects constructed by the application, each state machine engine configured to be in one of enabled or disabled states for its respective informational debug object; and a communications resource in communicating relationship with the network communication facility, wherein the logging service layer is configured to receive information from a first informational debug object constructed by the application and to direct the communications resource to forward the information to the centralized logging facility, provided that the state machine engine associated with the first informational object is in the enabled state.

14. A computer readable medium containing executable program instructions for coordinating the collection of error, trace, audit or other such information generated within a computer network, the executable program instructions comprising steps for:

constructing one or more informational debug objects at a first application or process whereby each informational debug object corresponds to a particular type of error, trace, audit or other information generated by the first application or process;

providing a logging service layer in communicating relationship with the application or process;

associating each informational debug object constructed at the first application or process with either an enabled state or a disabled state;

in response to obtaining error, trace, audit or other information at the first application or process, issuing a log command to the logging service layer that identifies the respective informational debug object and contains the obtained error, trace, audit or other information; and forwarding a log service request containing the obtained error, trace, audit or other information from the logging service layer to a selected logging facility, where the respective informational debug object is associated with the enabled state.

\* \* \* \* \*